United States Patent [19]

Bernhardt

[11] Patent Number: 5,776,015
[45] Date of Patent: Jul. 7, 1998

[54] GOLF RANGE FINDING APPARATUS

[76] Inventor: Arlyn M. Bernhardt, 4718 Glen Moor Way, Kokomo, Ind. 46902

[21] Appl. No.: 764,223

[22] Filed: Dec. 13, 1996

Related U.S. Application Data

[60] Provisional application No. 60/008,708, Dec. 15, 1995.
[51] Int. Cl.⁶ .................................................. G01C 22/00
[52] U.S. Cl. .................................................. 473/407
[58] Field of Search .......................... 473/407; 340/461; 235/95 R, 96, 97; 33/276, 277, 263; 116/222

[56] References Cited

U.S. PATENT DOCUMENTS

| | | |
|---|---|---|
| D. 194,040 | 11/1962 | Schroeder . |
| 1,363,670 | 12/1920 | Parker et al. . |
| 2,519,727 | 8/1950 | Yezdan . |
| 3,031,764 | 5/1962 | Larson . |
| 3,186,092 | 6/1965 | Bertas . |
| 3,409,987 | 11/1968 | New . |
| 3,441,209 | 4/1969 | Farman . |
| 3,824,698 | 7/1974 | Brucker . |
| 3,846,918 | 11/1974 | Wehlau . |
| 3,907,288 | 9/1975 | Hudak . |
| 3,908,281 | 9/1975 | Fox . |
| 3,977,086 | 8/1976 | Williams, Jr. . |
| 4,063,731 | 12/1977 | Kitay . |
| 4,719,798 | 1/1988 | Orkin . |
| 4,906,825 | 3/1990 | Wu ............................. 235/95 R |
| 5,159,314 | 10/1992 | Wayne ......................... 340/461 |

*Primary Examiner*—George Manuel
*Attorney, Agent, or Firm*—Rothwell, Figg, Ernst & Kurz

[57] ABSTRACT

A golf cart mounted range finding apparatus is disclosed which accurately determines the distance between a golfer's ball and the flag stick on the putting surface. The golf cart mounted range finder comprises a clip with a face plate containing a baseline and yardage indicators which is mounted on the frame which supports the roof of the cart. The golf-cart-mounted range finder is positioned at the seated golfer's eye level. The range finder preferably is clipped where an imaginary horizontal line, at eye level of the seated golfer, passes through the golf cart frame supporting the roof. The clip is formed so that it can be slid up and down the frame to adjust for golfers of differing heights. After accurately determining the distance between the ball and the flag stick, the golfer can make the proper club selection.

13 Claims, 1 Drawing Sheet

GOLF RANGE FINDING APPARATUS

BACKGROUND OF THE INVENTION

1. Priority Application

This application claims priority of provisional patent application Ser. No. 60/008,708, filed Dec. 15, 1995.

2. Field of the Invention

The invention relates generally to a range finding apparatus helpful in playing golf. Particularly, the invention relates to a range finder mounted on a golf cart which enables a seated golfer to quickly and accurately determine the distance from his or her golf ball to the flag stick in order to select the proper golf club and apply the correct swing parameters such as backswing and velocity.

3. Description of the Background Art

To skillfully play the game of golf, it is important to know the distance to the flag pole when approaching the green. Because this distance is often misjudged, golfers will under-club or over-club a shot which can materially adversely impact the golfer's score.

Devices have been developed to assist the golfer in determining the distance to the flag pole from the fairway. Primarily, these devices use a distant object of known dimension to estimate distances and operate on the principal that the farther away you are from an object, the smaller the object looks. Range finding systems utilizing this basic principal are described in U.S. Pat. No. 2,519,727 issued to T. R. Yezdan on Aug. 22, 1950, U.S. Pat. No. 3,409,987 issued to New on Nov. 12, 1968, U.S. Pat. No. 3,824,698 issued to Brucker on Jul. 23, 1974 and U.S. Pat. No. 3,907,288 issued to Hudak on Sep. 23, 1975.

Invariably, however, golf range finding devices known in the art have been bulky, expensive, difficult to use and, most importantly, inaccurate. Indeed, the prior art range finders can be inaccurate and difficult to use because a very steady hand is needed to ensure an accurate reading. This is especially true when reading very far distances. In many cases, if an unsteady hand causes the object measurement to be off by just a fraction of an inch, the distance measurement can by wrong by 30 to 60 yards or more. Moreover, for many of these devices, the accuracy of the distance measurement also depends on a very specific distance from the golfer's eye to the range finding device. This distance is usually calculated based on the length of a person's arm who is holding the golf range finder in his or her hand at arm's length. However, arm length varies greatly from person to person and, as explained above, small variations can cause significant errors in the distance measurement. In addition, previously patented devices as referenced above do not readily avail themselves to attachment to a golf cart.

Thus, there is a great need for a golf range finding apparatus which is easily constructed, inexpensive, convenient to use and provides accurate distance measurement and golf-club selection for the ever-increasing number of people who choose to use a golf cart.

SUMMARY OF THE INVENTION

The present invention relates to a novel apparatus for accurately determining the distance between a golfer's ball and the flag stick on the putting surface. The invention comprises a range finder mounted to a golf cart which enables the golfer to accurately measure the distance between the ball and the flag stick. In one embodiment, the golf-cart-mounted range finder comprises a clip with a face plate containing a baseline and yardage indicators which is mounted on the frame which supports the roof of the cart. The golf-cart-mounted range finder is positioned at the seated golfer's eye level. In a preferred embodiment, the device is clipped where an imaginary horizontal line, at eye level of the seated golfer, passes through the golf cart frame supporting the roof. The clip is formed so that it can be slid up and down the frame to adjust for golfers of differing heights.

When the cart approaches the ball in the fairway, the golfer positions the cart such that the flag stick in the distance appears next to the device. The yardage can be determined by first moving slightly in the golf cart seat so that the bottom of the flag stick is directly adjacent to the base line on the device and then noting what yardage is indicated adjacent to the top of the flag stick. After accurately determining the distance between the ball and the flag stick, the golfer can make the proper club selection.

Using the golf range finding apparatus of the present invention, the golfer will immediately notice how stable his body is when seated on the cart, thus making it quite easy to obtain accurate distance measurements. In addition, the device is always right there in front of the golfer making it extremely convenient to use.

The play of the game can often be quickened. Golfers who use the conventional means of determining yardage to the stick often search in the fairways near their ball for sprinkler heads with yardage indications on them. Once found, which in itself can be time consuming, the golfer may pace off the distance to his or her ball and then perform a mental calculation to come up with a distance. Unfortunately, this will invariably be the distance to the center of the green which may not be where the flag stick is located. On large greens, this off center flag stick placement can account for a significant error.

Yet another use for the range finder takes advantage of the standard fairway markers often placed at 200, 150 and 100 yards from the center of the green. A golfer can drive his or her cart up next to a standard fairway marker, take a reading on the range finder and know immediately the actual distance to the flag stick. The difference between that reading and the standard fairway indicator represents the location of the flag stick relative to the center of the green. The more familiar the golfer was with the course, the more valuable this information would be in determining what type of approach shot to try, given the amount of green in front of the flag stick.

DETAILED DESCRIPTION OF THE INVENTION

One embodiment of the present invention will be described in connection with FIGS. 1–5 which illustrate a golf range finding apparatus which is mounted to a golf cart 21. In this embodiment, the range finding apparatus comprises a clip 10 which is clipped to the golf cart 21 on either the driver's side roof support 22 or the passenger's side roof support 23, depending on which golfer is taking the readings. Of course, clip 10 could be mounted to each support 22 and 23.

Figure 1:
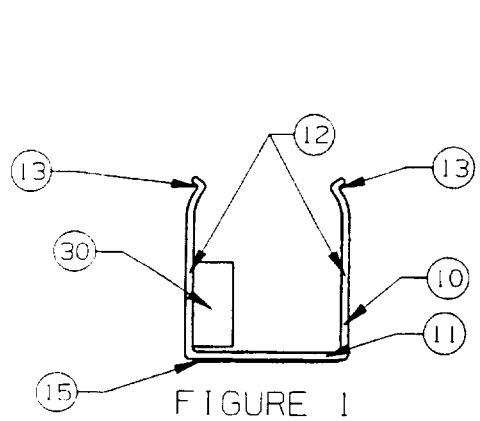
FIG. 1 is a top view of the golf cart mounted range finder.

The clip 10 comprises a face plate 11 connected to two side panels 12 so that the clip has a "U"-shaped cross section, as illustrated in FIG. 1. In this embodiment, the ends 13 of the side panels are bent inward. Clip 10 is constructed of a flexible material so that it can be flexed open to fit onto supports of many shapes (i.e. circular, square or rectangular) and many sizes, such as supports 22 or 23. Clip 10 holds onto the support by its own force and friction keeps the clip 10 from sliding up or down. The ends 13 keep the clip 10 from sliding forward although the flexibility of the material could provide adequate gripping force on the support 22 or 23.

Clip 10 is constructed of any suitable flexible, semi-rigid material, such as plastic or metal.

Figure 2:
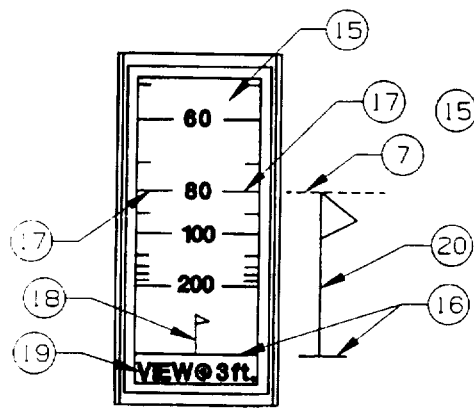
FIG. 2 front view of the golf cart mounted range finder.
Figure 3:
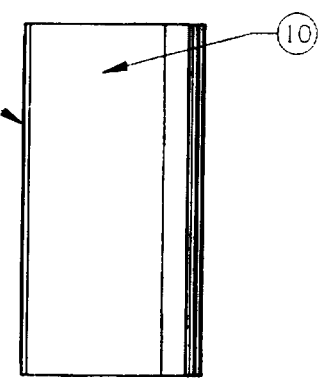
FIG. 3 is a side view of the golf cart mounted range finder.

As illustrated in FIGS. 1–3, the clip 10 further comprises a label 15 which is affixed to face plate 11 of clip 10. As shown in FIG. 2, the label 15 has a baseline 16 and several yardage indicators 17 on each side of the label 15. Having indicators 17 on both sides enables convenient viewing with the flag stick on either side of the roof supports 22 or 23. The label 15 also comprises a small flag 18, the bottom end of which is on the baseline 16. The small flag 18 is shown as a reminder that the base of the actual flag stick (illustrated at 20) should be adjacent to this baseline 16.

Label 15 also includes instructions 19 which indicate (e.g. "View @ 3 Ft.") the distance between the golfer's eye and the clip 10 which will enable accurate determination of the distance to the flag stick 20. For example, in a preferred embodiment of the present invention, the golf range finder is calibrated based on a separation of 36 inches between the golfer's eye and the clip 10, which is the approximate distance which normally exists between a comfortably seated golfer and the golf cart frame. However, the range finder can be calibrated to take into account any distance between the seated golfer's eye and a support such as 22 or 23. The yardage indicator 17 distance calculations from the baseline 16 have also taken into account the typical angle of the support bracket 22 or 23 to which the clip is mounted.

Label 15 can be affixed to the faceplate 11 by any suitable means known to persons skilled in the art such as, for example, an adhesive. In another embodiment, the information shown on label 15 (i.e., yardage indicators 17, the baseline 16, flag stick 18 and instruction 19) may also be imprinted onto faceplate 11.

In yet another embodiment of the present invention, the golf range finder comprises an adhesive strip which is directly mounted to the support 22 golf cart 21. The adhesive strip would contain the information illustrated on label 15, as described above.

Referring to FIG. 2, the distance from the golfer's ball to the flag stick 20 will be determined by the yardage indicator 17 which is adjacent to the top of the flag stick 20, as illustrated by dotted line 7. The distance from the base line 16 to each yardage indicator 17 corresponds to the distance between the range finder 10 and the flag stick 20 in accordance with the following equation:

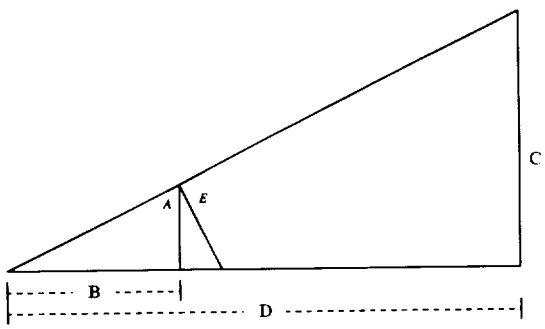

Zooming in on the label 15 area:

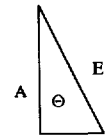

From Trigonometry: A/B = C/D and A/E = cos θ

Therefore: E = (B*C)/(D*cos θ)

Where A=Height of the flag stick 20 projected onto a vertically positioned label 15 at location 17 in inches B=Distance from golfer's eye to label 15 in inches C=Height of the flag stick 20 in yards D=Distance to the flag stick 20 in yards E=Height of the flag stick 20 projected onto the actual label 15 at location 17in inches θ=Angle between vertical and roof support 22 or 23 in degrees As described above in connection with a preferred embodiment, variable B is chosen to be 36 inches, variable C is 2.167 yards and θ is chosen to be 17°. Thus, in accordance with the preferred embodiment of the present invention, the relationship between the height of the flag stick 20 projected onto the label 15 (E) and the actual distance to the flag stick (D) is obtained from the equation E=(36*2.167)/(D*0.956) and is illustrated below in Table 1.

TABLE 1

| D<br>Distance to flag<br>stick (yards) | E<br>Flag stick height on<br>label (inches) |
|---|---|
| 50 | 1.63 |
| 60 | 1.36 |
| 70 | 1.17 |
| 80 | 1.02 |
| 90 | 0.91 |
| 100 | 0.82 |
| 120 | 0.68 |
| 140 | 0.58 |
| 160 | 0.51 |
| 180 | 0.45 |
| 200 | 0.41 |

These calculations are provided to illustrate only the preferred embodiment of the invention. The range finder of the present invention can be calibrated to take into account a flag stick of any size (C), distance from the golfer's eye to the range finder (B) and angle of the roof support bracket θ. Further, while label 15 is calibrated to determine distance (A) from 50 to 200 yards, the label can also be configured to determine any distance encountered on a golf course.

The label 15 could also be calibrated to accommodate a vertical roof support bracket by modifying the equation set forth above as follows: A/B=C/D.

Figure 5:
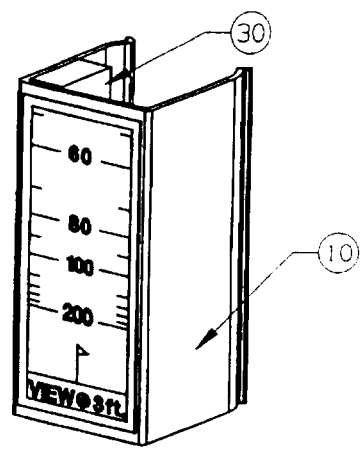
FIG. 5 is a top elevational view of an alternative embodiment of the golf cart mounted range finder.

In still another embodiment of the present invention, a spacer 30 is fastened to the inside edge of the clip 10, as is illustrated in FIG. 5, to facilitate securing the clip 10 to a golf cart support (such as support 22 or 23) having a smaller frame. In a preferred embodiment, the spacer 30 consists of foam rubber and is secured to the inside edge of the clip 10 by an adhesive. Of course, the spacer 30 can be made of other materials, and could be secured to the clip 10 by other fastening means, known to persons having ordinary skill in the art. The dimensions of the spacer are selected so that the clip 10 can be securely fastened to the golf cart support. For example, assuming that clip 10 was constructed to be securely fastenable to a 1" golf cart support, and the user wanted to fasten clip 10 to a ¾" golf cart support, the spacer 30 could have the following approximate dimensions: ⅛"×⅛"×2".

Figure 4:
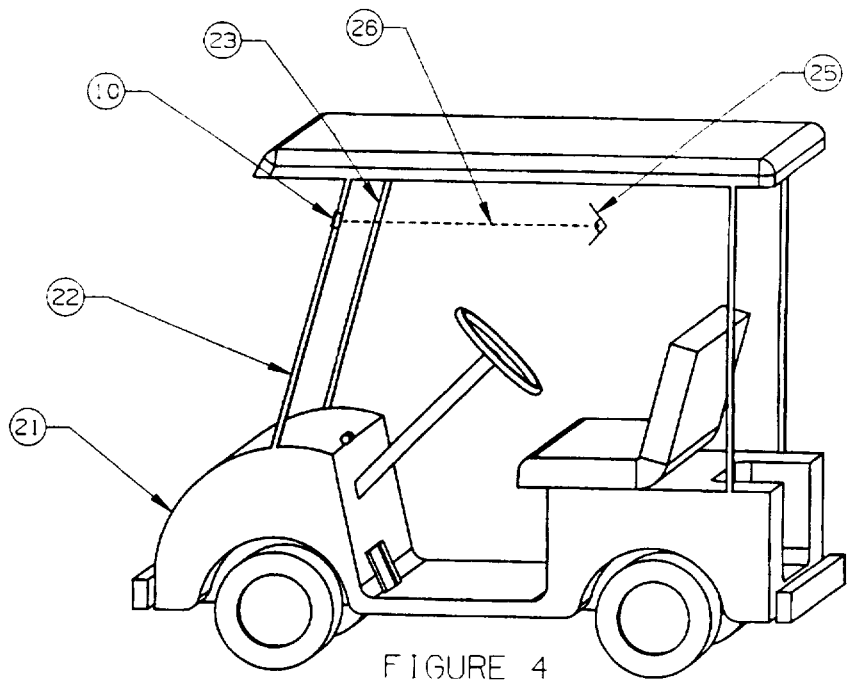
FIG. 4 is a sketch of a golf cart showing the range finder mounted on the driver's side roof support bracket.

Operation of the present invention will be described as follows in connection with FIG. 4. At the start of the game, the golfer positions himself or herself on the golf cart seat and looks horizontally into the distance. The clip 10 should be clipped onto support 22 and/or 23 where an imaginary horizontal line 26, at the eye level of the seated golfer 25, passes through the golf cart frame supporting the roof. The clip 10 can be slid up and down the support 22 and/or 23 to adjust for golfers of differing heights.

To insure extreme accuracy, the golfer may initially use a measuring device such as a yardstick or a yard long non-flexible string to get the correct "feel" of the body position that puts his or her eye 25 at exactly three feet 26 from the range finder 10. Once this position is known, it can be quite repeatable in future sightings.

When the cart approaches the ball in the fairway, the golfer positions the cart such that the flag stick 20 in the distance appears next to the label 15 on the clip 10. The yardage can be determined by first moving slightly in the golf cart seat so that the bottom of the flag stick 20 is directly adjacent to the base line 16 on label 15 and by then noting the yardage which is indicated adjacent to the top of the flag stick 20. After accurately determining the distance between the ball and the flag stick 20, the golfer can make the proper club selection.

The present invention provides an easily constructed, inexpensive golf range finding apparatus which has significant advantages over the prior art including, for example, more accurate distance measurements (which leads to more accurate club selection) and added convenience and time savings for the golfer who is utilizing a golf cart.

Since many modifications, variations and changes in detail may be made to the described embodiments, it is intended that all matter in the foregoing description and shown in the accompanying drawings be interpreted as illustrative and not in a limiting sense.

I claim:

1. A golf cart mounted range finding apparatus for accurately determining the distance between a golfer's ball and a flag stick on a putting surface, said apparatus comprising:
   (a) a golf cart having a support frame attached to a base portion of said golf cart, said support frame extending upward from said base portion of said golf cart;
   (b) a range finder, said range finder comprising a clip having a face plate, said face plate having a baseline and calibrated yardage indicators, said range finder being removably mounted to said support frame on said golf cart; and wherein the length of said flag stick on said putting surface measured from said baseline of said face plate corresponds to an actual distance between the golfer and said flag stick on said putting surface.

2. The apparatus of claim 1 wherein said range finder is mounted on the support frame where an imaginary horizontal line, at eye level of an seated golfer, passes through said support frame of said golf cart.

3. The apparatus of claim 1 wherein said support frame of said golf cart supports a roof covering a passenger compartment of said golf cart.

4. The apparatus of claim 1 wherein said clip has a substantially U-shaped cross section which frictionally engages said support frame of said golf cart.

5. The apparatus of claim 4 wherein said clip adjustably mounts to said support frame of said golf cart so as to be adjustable for golfers of differing height.

6. The apparatus of claim 4 wherein said clip comprises side panels for frictionally engaging said support frame and end portions, said end portions being bent inwardly to keep said clip from sliding forward.

7. The apparatus of claim 1 wherein said clip is constructed of a flexible material so that it can be flexed open to fit onto golf cart support frames of many shapes.

8. The apparatus of claim 1 further comprising a spacer affixed to an inside edge of said clip so as to permit mounting of said clip to a smaller golf cart support frame.

9. A golf range finding apparatus for accurately determining the distance between a golfer's ball and a flag stick on a putting surface, said apparatus comprising:
   (a) a clip, said clip having a face plate and two side panels extending from said face plate, said face plate and side panels having a substantially U-shaped cross section for mounting to a support frame of a golf cart;
   (b) a label mounted on said face plate having a baseline and calibrated yardage indicators, and
   wherein the length of said flag stick on said putting surface measured from said baseline of said face plate corresponds to an actual distance between the golfer and said flag stick on said putting surface.

10. The apparatus of claim 9 wherein said side panels further comprise end portions, said end portions being bent inwardly.

11. The apparatus of claim 9 wherein said clip is constructed of a flexible material.

12. The apparatus of claim 9 further comprising a spacer affixed to an inside edge of said clip so as to permit mounting of said clip to a smaller golf cart support frame.

13. A method for accurately determining the distance between a golfer's ball and a flag stick on a putting surface, said method comprising:
   (a) removably mounting a clip having a face plate containing a baseline and calibrated yardage indicators to a golf cart having a support frame extending upward from said golf cart;
   (b) positioning said clip mounted to said golf cart such that the flag stick on the putting surface in the distance appears next to said clip;
   (c) visually positioning the flag stick on the putting surface so that the bottom of the flag stick on the putting surface is directly adjacent to the baseline on the clip; and
   (d) identifying the calibrated yardage indicator adjacent to the top of the flag stick which accurately reflects the distance between the golfer and the flag stick.

* * * * *